US011819941B2

(12) United States Patent
Baek et al.

(10) Patent No.: US 11,819,941 B2
(45) Date of Patent: Nov. 21, 2023

(54) LASER PROCESSING APPARATUS AND METHOD OF MANUFACTURING THE SAME

(71) Applicant: SAMSUNG DISPLAY CO., LTD, Yongin-si (KR)

(72) Inventors: Jinwon Baek, Hwaseong-si (KR); Seokjoo Lee, Hwaseong-si (KR); Sangsun Han, Suwon-si (KR); Kyongho Hong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 714 days.

(21) Appl. No.: 16/384,458

(22) Filed: Apr. 15, 2019

(65) Prior Publication Data

US 2020/0086423 A1 Mar. 19, 2020

(30) Foreign Application Priority Data

Sep. 18, 2018 (KR) .......................... 10-2018-0111786

(51) Int. Cl.
*B23K 26/06* (2014.01)
*G02B 13/00* (2006.01)
(Continued)

(52) U.S. Cl.
CPC ...... *B23K 26/0821* (2015.10); *B23K 26/0648* (2013.01); *B23K 26/0665* (2013.01);
(Continued)

(58) Field of Classification Search
CPC .. B23K 26/00; B23K 26/082; B23K 26/0643; B23K 26/0648; B23K 26/0821; B23K 26/702; B23K 26/0665; G02B 19/0009; G02B 19/0014; G02B 19/0047; G02B 13/0005; G02B 26/105; G02B 26/101
See application file for complete search history.

(56) References Cited

U.S. PATENT DOCUMENTS 5,870,133 A * 2/1999 Naiki .................. G02B 7/028
347/247
8,610,030 B2 * 12/2013 Oba .................. B23K 26/0736
219/121.83
2015/0212318 A1 * 7/2015 Huonker ............. G02B 26/101
359/198.1

FOREIGN PATENT DOCUMENTS

JP 7-16768 A 1/1995
JP 2003-0255426 9/2003
(Continued)

OTHER PUBLICATIONS

English translation of JP 2003255426 (Year: 2003).*
English Translation of JPH0716768 (Year: 1995).*

*Primary Examiner* — Joseph S Del Sole
*Assistant Examiner* — Baileigh Kate Darnell
(74) *Attorney, Agent, or Firm* — Lewis Roca Rothgerber Christie LLP

(57) ABSTRACT

A laser processing apparatus includes: a laser light source configured to emit a laser beam; an optical scanner located along a path of the laser beam and configured to adjust the path of the laser beam; a lens unit located along the path of the laser beam, the lens unit being configured to condense the laser beam; a first adapter located between the lens unit and the optical scanner and coupled to the lens unit; and a second adapter located between the first adapter and the optical scanner, the second adapter being coupled to the first adapter and the optical scanner.

17 Claims, 7 Drawing Sheets

(51) Int. Cl.
*G02B 19/00* (2006.01)
*B23K 26/082* (2014.01)
*G02B 26/10* (2006.01)
*B23K 26/70* (2014.01)

(52) U.S. Cl.
CPC ........ *B23K 26/702* (2015.10); *G02B 13/0005* (2013.01); *G02B 19/0009* (2013.01); *G02B 19/0047* (2013.01); *G02B 26/105* (2013.01)

(56) References Cited

FOREIGN PATENT DOCUMENTS

| | | |
|---|---|---|
| JP | 2007-275962 A | 10/2007 |
| JP | 6286298 | 2/2018 |
| KR | 20-0444501 | 5/2009 |
| KR | 10-1622698 | 5/2016 |
| KR | 10-1809036 | 12/2017 |

\* cited by examiner

LASER PROCESSING APPARATUS AND METHOD OF MANUFACTURING THE SAME

CROSS-REFERENCE TO RELATED APPLICATION

This application claims priority to and the benefit of Korean Patent Application No. 10-2018-0111786, filed on Sep. 18, 2018, in the Korean Intellectual Property Office (KIPO), the disclosure of which is incorporated by reference herein in its entirety.

BACKGROUND

1. Field

Embodiments of the present invention relate to a laser processing apparatus and a method of manufacturing the laser processing apparatus.

2. Discussion of Related Art

Laser processing apparatuses are devices using a laser beam for, for example, cutting a material, forming a pattern, and welding. A laser beam used in laser processing has a strong directivity and a high density. Particularly, a high-powered laser may enable precise processing, while not affecting the surroundings, and may thus be used for processing display panels.

The laser processing apparatus may include, for example, a laser light source that outputs a laser beam, an optical scanner that adjusts an incidence position of the output laser beam, and a lens unit that condenses the laser beam whose incidence position is determined. In such an embodiment, stress may concentrate on a local portion of the laser processing apparatus due to load of the lens unit, and rigidity of the laser processing apparatus may be lowered.

It is to be understood that this background of the technology section is intended to provide useful background for understanding the technology and as such, the technology background section may include ideas or concepts that were not already known or appreciated by those skilled in the pertinent art prior to the effective filing date of the present application.

SUMMARY

Aspects of embodiments of the present invention are directed to a laser processing apparatus having improved rigidity.

According to an embodiment, a laser processing apparatus includes: a laser light source configured to emit a laser beam; an optical scanner located along a path of the laser beam and configured to adjust the path of the laser beam; a lens unit located along the path of the laser beam, the lens unit being configured to condense the laser beam; a first adapter located between the lens unit and the optical scanner and coupled to the lens unit; and a second adapter located between the first adapter and the optical scanner, the second adapter being coupled to the first adapter and the optical scanner.

The lens unit may include: a lens; and a lens housing including a coupling portion and a non-coupling portion, the lens housing accommodating the lens.

The coupling portion may have a first opening located along the path of the laser beam, and may have screw threads at an outer surface thereof.

The first adapter may have screw threads at an inner surface thereof and may be configured to be screw-coupled to the coupling portion.

An outer diameter of the coupling portion may be less than an outer diameter of the non-coupling portion.

The second adapter may include: a bottom portion at which the optical scanner is seated, the bottom portion having a plurality of first fastener openings and a plurality of second fastener openings; opposite side portions bent and extending from the bottom portion and opposing each other with the optical scanner interposed therebetween; and a support portion bent and extending from the bottom portion and the opposite side portions.

The optical scanner may directly contact a first surface of the bottom portion, and the first adapter may directly contact a second surface of the bottom portion that opposes the first surface.

An area of the bottom portion may be larger than an area defined by an outer surface of the first adapter on a plane.

The optical scanner may have a plurality of first grooves corresponding to the plurality of first fastener openings, respectively, and the first adapter may have a plurality of second grooves corresponding to the plurality of second fastener openings, respectively.

The laser processing apparatus may further include a plurality of first screws each inserted into corresponding ones of the plurality of first fastener openings and corresponding ones of the plurality of first grooves; and a plurality of second screws each inserted into corresponding ones of the plurality of second fastener openings and corresponding ones of the plurality of second grooves.

The plurality of first screws may be inserted in a first direction from the second adapter toward the optical scanner, and the plurality of second screws may be inserted in a second direction from the second adapter toward the first adapter.

The first direction and the second direction may be parallel to each other, and opposite to each other.

An outer diameter of each of the plurality of first screws may be substantially equal to or less than an outer diameter of each of the plurality of second screws.

The optical scanner may not overlap the plurality of second fastener openings.

The laser processing apparatus may further include a frame coupled to the support portion.

At least one of the opposite side portions may have a second opening located along the path of the laser beam.

The lens unit may include an F-theta lens unit that adjusts a focal length of the laser beam that is incident to the lens unit to a constant value.

According to an embodiment, a method of manufacturing a laser processing apparatus includes: screw-coupling a first adapter that has screw threads at an inner surface thereof to a coupling portion of a lens unit that has screw threads at an outer surface thereof; coupling an optical scanner and a second adapter to each other using a plurality of first screws; and coupling the first adapter and the second adapter to each other using a plurality of second screws.

The plurality of first screws may be inserted in a first direction from the second adapter toward the optical scanner, and the plurality of second screws may be inserted in a second direction from the second adapter toward the first adapter.

The first direction and the second direction may be parallel to each other and opposite to each other.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the present invention will become more apparent by describing in detail embodiments thereof with reference to the accompanying drawings, wherein.

DETAILED DESCRIPTION

Figure 1:
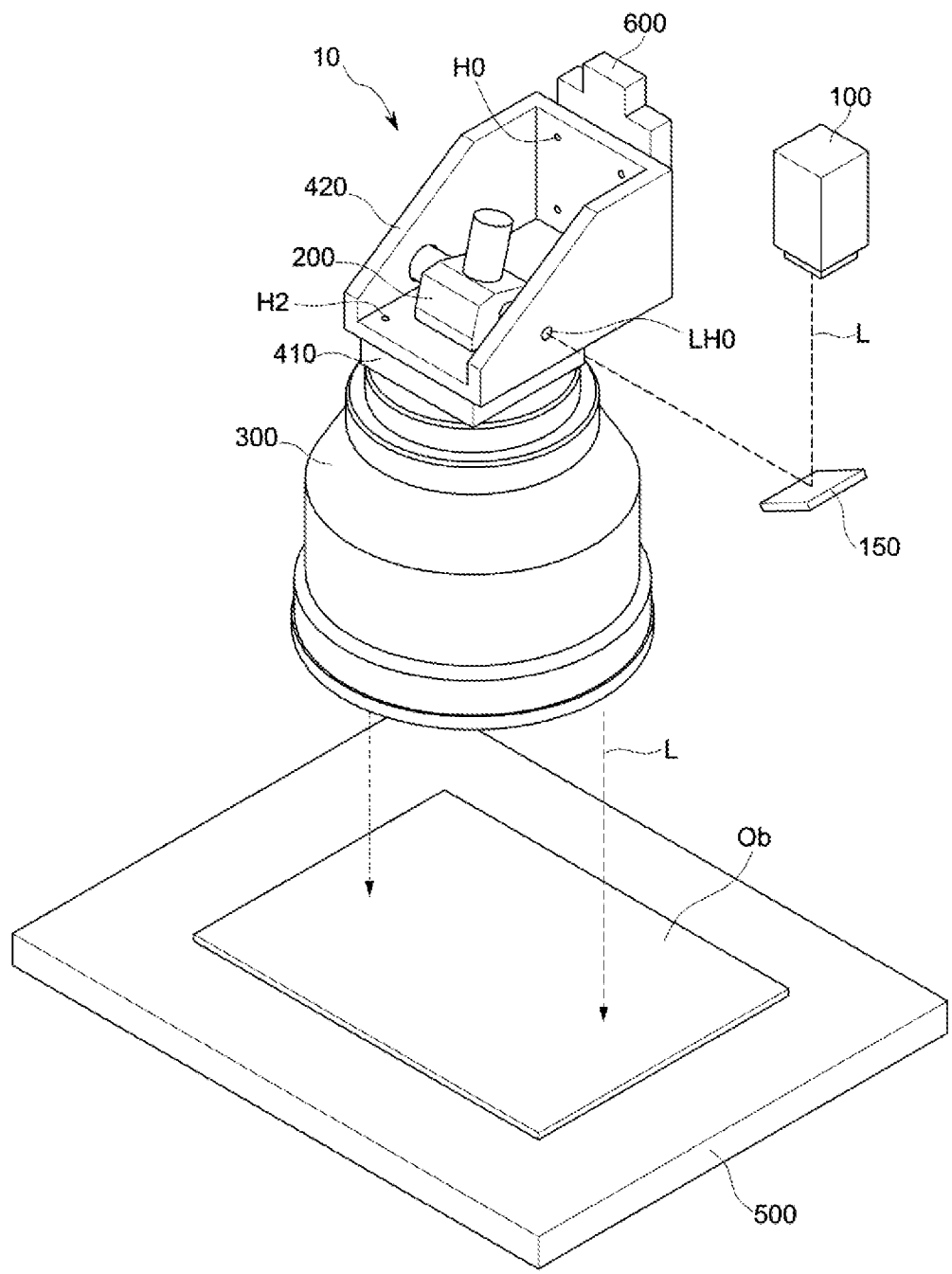
FIG. 1 is a perspective view illustrating a laser processing apparatus according to an embodiment of the present invention.

Embodiments of the present invention are described more fully hereinafter with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween. In addition, it will be understood that when an element or layer is referred to as being "between" two elements or layers, it can be the only element or layer between the two elements or layers, or one or more intervening elements or layers may also be present.

The spatially relative terms "below", "beneath", "lower", "above", "upper" and the like may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device located "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected to" or "coupled to" another element, the element may be directly connected to or directly coupled to the other element, or electrically connected to or electrically coupled to the other element with one or more intervening elements interposed therebetween. It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

The terminology used herein is for the purpose of describing particular embodiments and is not intended to be limiting of the present invention. As used herein, the singular forms "a" and "an" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list.

"About," "substantially," or "approximately" as used herein is inclusive of the stated value and means within an acceptable range of variation for the particular value as determined by one of ordinary skill in the art, considering the measurement in question and the error associated with measurement of the particular quantity (i.e., the limitations of the measurement system). For example, "about" may mean within one or more standard variations, or within ±30%, 20%, 10%, 5% of the stated value. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, an exemplary embodiment of the present invention is described with reference to FIGS. 1-6.

Figure 2:
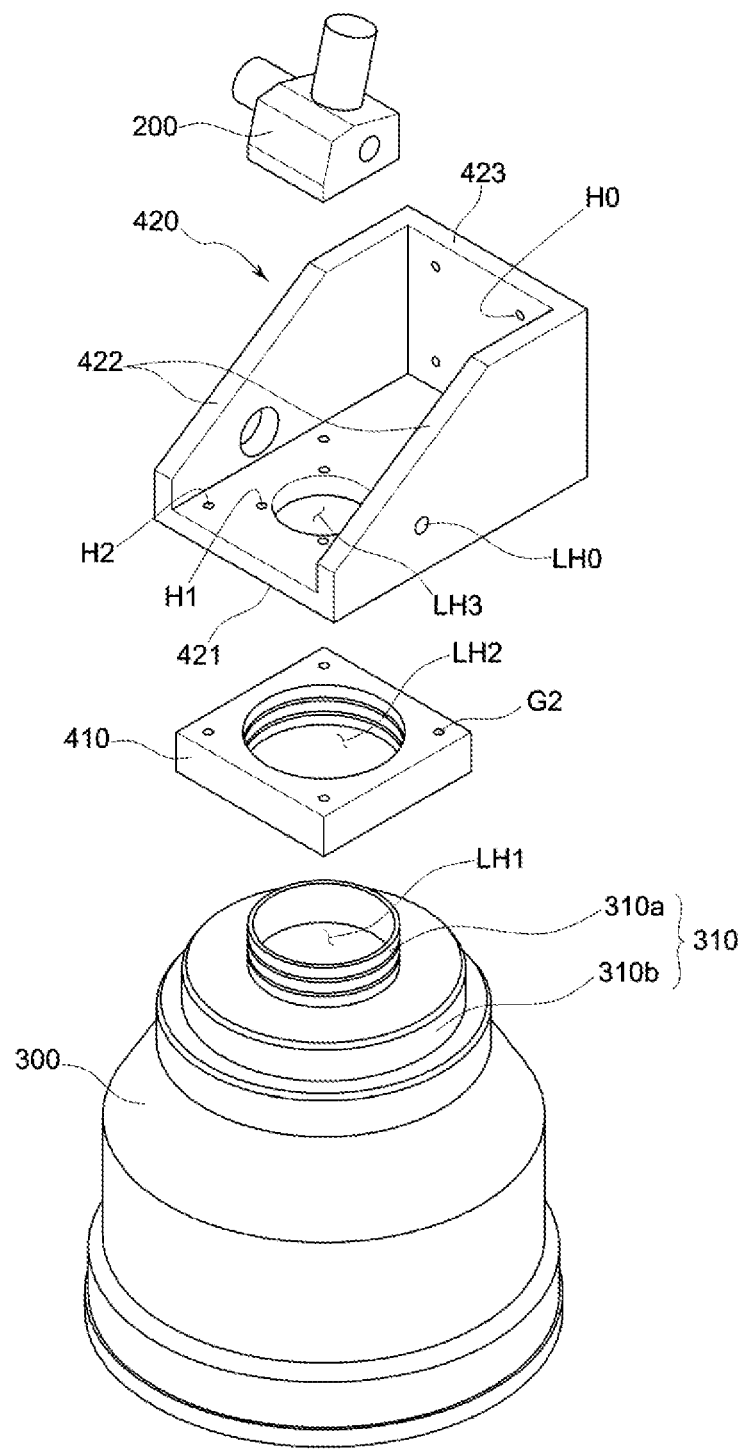
FIG. 2 is an exploded perspective view illustrating an optical scanner, a lens unit, a first adapter, and a second adapter of a laser processing apparatus according to an embodiment of the present invention.
Figure 3:
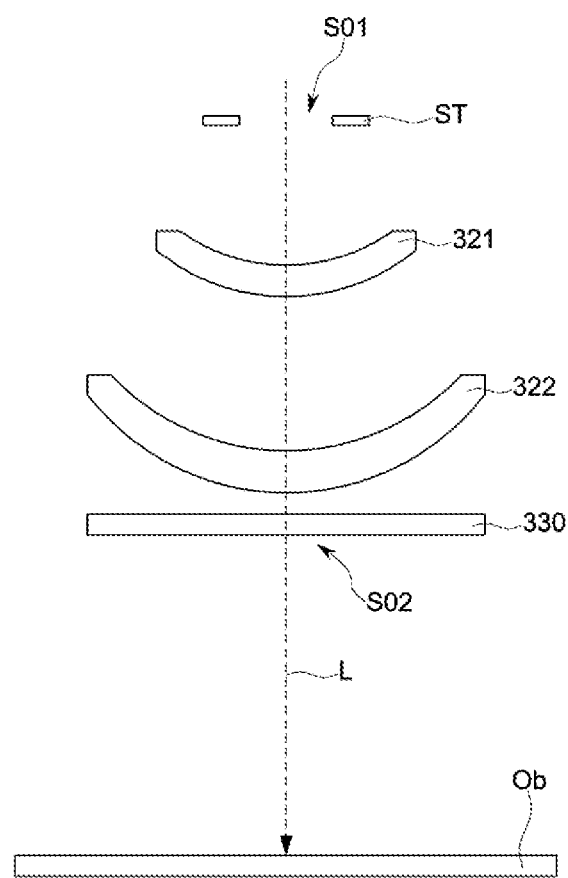
FIG. 3 is a cross-sectional view schematically illustrating an optical mechanism of a lens unit according to an embodiment of the present invention.

FIG. 1 is a perspective view illustrating a laser processing apparatus 10 according to an embodiment of the present invention, FIG. 2 is an exploded perspective view illustrating an optical scanner 200, a lens unit 300, a first adapter 410, and a second adapter 420 of a laser processing apparatus 10 according to an embodiment of the present invention, and FIG. 3 is a schematic cross-sectional view illustrating an optical mechanism of the lens unit 300 according to an embodiment of the present invention.

Referring to FIGS. 1 and 2, a laser processing apparatus 10 according to an embodiment of the present invention includes, for example, a laser light source 100, a path conversion member 150, the optical scanner 200, the lens unit 300, the first adapter 410, the second adapter 420, a stage 500, and a frame 600.

The laser light source 100 generates a laser beam L and emits the laser beam L to the path conversion member 150. The laser light source 100 may emit the laser beam L continuously or discontinuously. In addition, the laser light source 100 may emit a single beam or may emit multiple beams. Wavelength, amplitude, energy density, etc. of the laser beam L may be adjusted using a separate controller, depending on a utilized process.

The path conversion member 150 is disposed between the laser light source 100 and the optical scanner 200. The path conversion member 150 changes (e.g., is configured to change) a path of the laser beam L so that the laser beam L emitted from the laser light source 100 may proceed toward the optical scanner 200. For example, the path conversion member 150 may be disposed on (e.g., along or in) the path of the laser beam L. However, in some embodiments, the path conversion member 150 may be omitted. For example, when the path conversion member 150 is omitted, the laser beam L emitted from the laser light source 100 may propagate straight in (e.g., along) a direction of being emitted (e.g., along a propagation direction), and may be incident to the optical scanner 200.

The optical scanner 200 adjusts the path of the laser beam L incident thereto. For example, the optical scanner 200 may change the propagation direction of the laser beam L that is incident thereto toward the lens unit 300. The optical scanner 200 may include at least one reflection mirror. For example, the optical scanner 200 may be a Galvano scanner that includes two reflection mirrors.

The lens unit 300 condenses the laser beam L provided from the optical scanner 200. The laser beam L condensed by the lens unit 300 may be incident to an object (e.g., an object to be processed) Ob that is disposed on the stage 500. For example, the object Ob may include one or more of a substrate, a glass, and a semiconductor layer. However, the type of the object Ob is not particularly limited.

The lens unit 300 may be an F-theta lens unit. The F-theta lens unit has characteristics that it focuses on a same plane irrespective of an incidence angle of the laser beam L that is incident thereto. Accordingly, the object Ob may be processed with a substantially constant energy regardless of the position (or incident angle) relative to the laser beam L. For example, the lens unit 300 according to an embodiment of the present invention may be an F-theta lens unit that has a focal length in a range from about 200 mm to about 300 mm, but embodiments are not limited thereto.

The lens unit 300 includes a lens housing 310 and at least one lens (e.g., a first lens 321 and a second lens 322 (see FIG. 3)) accommodated in the lens housing 310. The lens housing 310 according to an embodiment of the present invention may have a body tube shape.

The lens housing 310 includes a coupling portion 310a and a non-coupling portion 310b. The coupling portion 310a of the lens housing 310 may have a screw thread that is formed at an outer surface of the lens housing 310 so as to be screw-coupled to the first adapter 410, described further below. In addition, the lens housing 310 may have a first opening (e.g., a first through hole) LH1 located on (e.g., in or along) the path of the laser beam L. For example, the coupling portion 310a of the lens housing 310 may have screw threads at an outer surface thereof (or may have a shape of an external screw) and defines the first through hole LH1.

Referring to FIG. 3, the lens unit 300 according to an embodiment of the present invention includes the first lens 321, the second lens 322, and a window 330 that are accommodated at the lens housing 310. In such an embodiment, the first lens 321, the second lens 322, and the window 330 may be disposed sequentially along the propagation direction of the laser beam L. Hereinafter, for ease of description, a side of the lens unit 300 that is located adjacent to (e.g., faces) the optical scanner 220 and to which the laser beam L is incident is referred to as a first side S01, and a side of the lens unit 300 to which the laser beam L is emitted toward the object Ob (e.g., faces the object Ob) is referred to as a second side S02.

In some embodiments, the lens unit 300 according to an embodiment of the present invention may include a diaphragm ST that is positioned on (e.g., at) the first side S01 of the lens unit 300, the first and second lenses 321 and 322 that each have a shape that is convex toward the propagation direction of the laser beam L, and the window 330 that is positioned on the second side S02 of the lens unit 300 and protects the first and second lenses 321 and 322.

The diaphragm ST is disposed adjacent to the optical scanner 200. A diameter of an entrance pupil that corresponds to a diameter of the diaphragm ST may be about 100 mm or more. Accordingly, a sufficient amount of light can be transmitted through the lens unit 300. However, embodiments are not limited thereto, and the diaphragm ST may have any suitable diameter.

Each of the first and second lenses 321 and 322 may have a shape of a meniscus that has a concave surface at (e.g., on) the first side S01, and may have a positive refractive power. Although opposite surfaces of each of the first and second lenses 321 and 322 according to an embodiment of the present invention that oppose each other in the propagation direction of the laser beam L are depicted as having a spherical surface, embodiments are not limited thereto. In an embodiment, at least one of the opposite surfaces of each of the first and second lenses 321 and 322 that oppose each other may be an aspherical surface. For example, one of the opposite surfaces (e.g., a first surface) of the first lens 321 that is adjacent to the first side S01 may be a spherical surface, and another surface (e.g., a second surface) of the first lens 321 that is adjacent to the second side S02 may be an aspherical surface. Similarly, one of the opposite surfaces (e.g., a third surface) of the second lens 322 that is adjacent to the first side S01 may be a spherical surface, and another surface (e.g., a fourth surface) of the second lens 322 that is adjacent to the second side S02 may be an aspherical surface.

Each of the first and second lenses 321 and 322 may include, for example, zinc selenide (ZnSe) or germanium (Ge), which have excellent light transmittance. For example, the first lens 321 may include zinc selenide (ZnSe), and the second lens 322 may include germanium (Ge). However, embodiments are not limited thereto, and the first and second lenses 321 and 322 may include any suitable material(s) known to those skilled in the art.

The window 330 protects the first and second lenses 321 and 322 that are accommodated in the lens housing 310. The window 330 may have a plate shape and may be coupled to the lens housing 310. The window 330 may include glass or plastic having light transmittance, but embodiments are not limited thereto. The window 330 may transmit light that passes through the lens unit 300, and may substantially prevent a foreign matter from outside the lens unit 300 from infiltrating into the lens unit 300.

For example, the lens unit 300 according to an embodiment of the present invention may be an F-theta lens unit that includes two lenses (e.g., the first lens 321 and the second lens 322). However, embodiments are not limited thereto, and the lens unit 300 may include three or more lenses, for example. In addition, the laser processing apparatus 10 according to an embodiment of the present invention may further include a reflection member disposed between the optical scanner 200 and the lens unit 300 so as to adjust an angle of the laser beam L that is incident to the lens unit 300.

Referring again to FIGS. 1 and 2, the first adapter 410 is disposed between the optical scanner 200 and the lens unit 300, and the second adapter 420 is disposed between the first adapter 410 and the optical scanner 200.

The first adapter 410 is coupled to each of the optical scanner 200 and the lens unit 300. Particularly, the first adapter 410 is screw-coupled to the coupling portion 310a of the lens unit 300. For example, the first adapter 410 may have a shape of an internal screw to be screw-coupled with the coupling portion 310a of the lens housing 310. In other words, the first adapter 410 may have a second opening (e.g., a second through-hole) LH2 located on the path of the laser beam L, and may have a shape of a ring that encloses the periphery of the coupling portion 310a. Although an outer surface of the first adapter 410 according to an embodiment of the present invention is depicted as having a quadrangular shape in a plan view in the figures, embodiments are not limited thereto. In an embodiment, the outer surface of the first adapter 410 may be, for example, circular, hexagonal, or octagonal in shape.

The second adapter 420 may be coupled to each of the first adapter 410 and the optical scanner 200 and may directly contact the first adapter 410 and the optical scanner 200. The second adapter 420 includes a bottom portion 421, opposite side portions 422 bent and extending from the bottom portion 421, and a support portion 423 bent and extending from the bottom portion 421 and the opposite side portions 422. The bottom portion 421, the opposite side portions 422, and the support portion 423 of the second adapter 420 may define a space in which the optical scanner 200 is accommodated.

The bottom portion 421 is located between the first adapter 410 and the optical scanner 200. In some embodiments, the optical scanner 200 is seated at an upper surface of the bottom portion 421. The bottom portion 421 may have a third opening (e.g., a third through hole) LH3 that is located on (e.g., in or along) the path of the laser beam L. In addition, the bottom portion 421 has a plurality of first and second fastener openings (e.g., first and second screw holes) H1 and H2 to be coupled with the optical scanner 200 and the lens unit 300. A plurality of fasteners (e.g., screws) (see S1 and S2 in FIGS. 5 and 6) may be inserted into the plurality of screw holes H1 and H2, respectively, described in further detail below.

The opposite side portions 422 are located opposing (e.g., facing) each other with the optical scanner 200 therebetween. At least one of the opposite side portions 422 has a fourth opening (e.g., a fourth through hole) LH0 located on (e.g., along) the path of the laser beam L. For example, the laser beam L emitted from the laser light source 100 may pass through the fourth through hole LH0 that is located on one of the opposite side portions 422 of the second adapter 420 and may be incident to the optical scanner 200.

The support portion 423 may be integrally formed with the bottom portion 421 and the opposite side portions 422 into a unitary structure, and may reinforce rigidity of the second adapter 420. In addition, the support portion 423 may be coupled to the frame 600. The support portion 423 may have at least one third fastener opening (e.g., third screw hole) H0 to be coupled to the frame 600. In some embodiments, the frame 600 may have a groove (e.g., a screw groove) or a fourth fastener opening (e.g., a fourth screw hole) corresponding to the third screw hole H0 of the support portion 423, and the support portion 423 and the frame 600 may be coupled to each other using at least one fastener (e.g., at least one screw). However, embodiments are not limited thereto, and the support portion 423 and the frame 600 may be coupled to each other through various known techniques.

Each of the first and second adapters 410 and 420 may include a rigid metal material, e.g., stainless steel, or a material that has a good heat dissipation property, e.g., aluminum or an aluminum alloy. The first and second adapters 410 and 420 may be formed by a press molding process so as to, for example, have holes (or openings) and include bent portions.

In addition, the laser processing apparatus 10 according to an embodiment of the present invention may further include a motor connected to the frame 600. For example, the laser processing apparatus 10 may include a linear servomotor, and the second adapter 420 coupled to the frame 600 may move vertically (e.g., up and down) by the linear servomotor. The linear servomotor does not require an intermediate transmission mechanism, e.g., a belt and pulley, a ball screw, and a rack and pinion. The linear servomotor may be used more suitably for highly precise alignment by using a linear encoder.

Hereinafter, a laser processing apparatus 10 according to an embodiment of the present invention is described in additional detail with reference to FIGS. 4, 5, and 6. In addition, a method of manufacturing the laser processing apparatus 10 is described.

Figure 4:
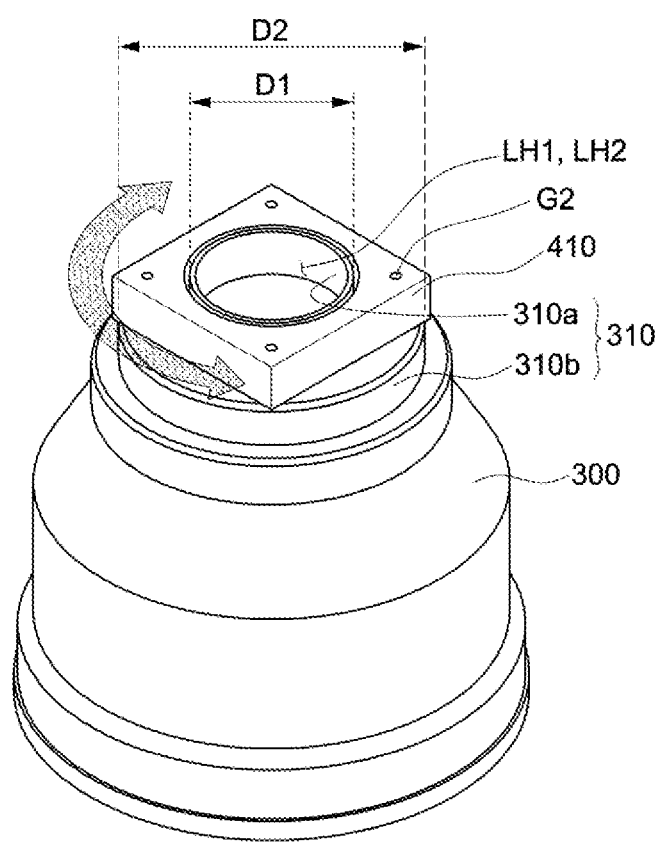
FIGS. 4-6 are perspective views illustrating a method of manufacturing a laser processing apparatus according to an embodiment of the present invention.

First, referring to FIG. 4, the lens unit 300 and the first adapter 410 are coupled to each other. According to embodiments, the first adapter 410 that has a shape of an internal screw is coupled (e.g., screw-coupled) to the coupling portion 310a of the lens housing 310 that has a shape of an external screw. For example, the coupling portion 310a of the lens housing 310 may have a screw thread and a screw valley that are formed at an outer surface of the coupling portion 310a, and the first adapter 410 may have a screw thread and a screw valley that are formed at an inner surface of the first adapter 410.

The lens unit 300 includes at least one lens (e.g., the first lens 321 and/or the second lens 322) accommodated in the lens housing 310. When an additional opening (or hole) for inserting a screw thereinto is defined at the lens housing 310, a problem in which foreign matter may flow into the lens housing 310 or the lens (e.g., the first lens 321 and/or the second lens 322) accommodated in the lens housing 310, which may cause damage while coupling the screw. Because the lens housing 310 according to an embodiment of the present invention includes the coupling portion 310a that has screw threads at an outer surface thereof and is coupled to the first adapter 410 that has screw threads at an inner surface thereof, such a problem may be substantially prevented, or the likelihood thereof may be reduced.

In such an embodiment, the lens unit 300 that is relatively heavy in weight may be located at a separate structure, e.g., a jig, and then the first adapter 410 that is relatively light in weight may be rotated so that the first adapter 410 may be coupled to the lens unit 300. Accordingly, an operator may more easily couple the lens unit 300 and the first adapter 410 to each other, and may substantially prevent, or reduce the likelihood of, an accident that may occur by handling the lens unit 300 that is relatively heavy.

The coupling portion 310a of the lens housing 310 according to an embodiment of the present invention has an outer diameter that is less than an outer diameter of the non-coupling portion 310b. For example, as illustrated in FIG. 4, when the outer diameter of the coupling portion 310a is referred to as a first outer diameter D1 and a minimum outer diameter of the non-coupling portion 310b is referred to as a second outer diameter D2, the first outer diameter D1 is less than the second outer diameter D2. Accordingly, the non-coupling portion 310b may serve as a stopper, and thus the first adapter 410 may not continuously rotate, and may stop to be positioned at a location in direct contact with the outer surface of the coupling portion 310a.

Figure 5:
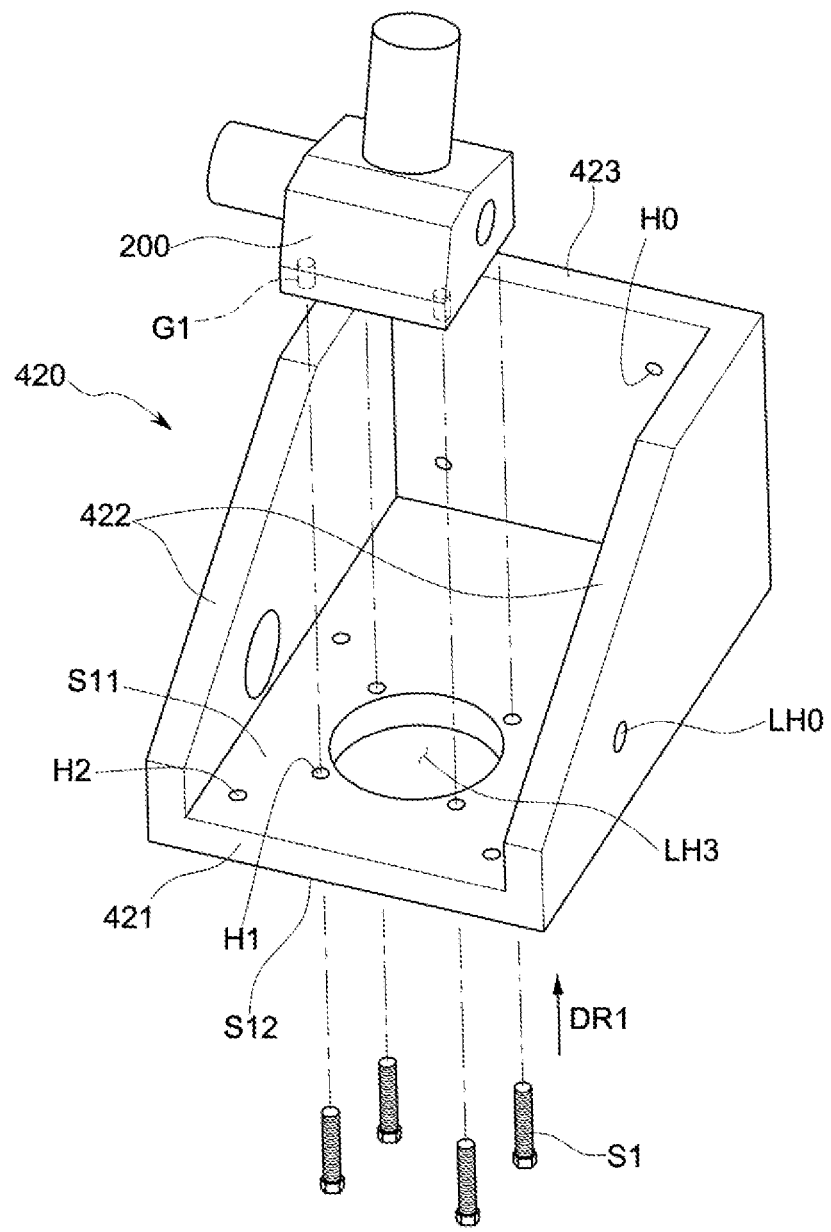

Next, referring to FIG. 5, the optical scanner 200 and the second adapter 420 are coupled to each other by the plurality of first screws S1. For example, the bottom portion 421 of the second adapter 420 has the plurality of first screw holes H1, and the optical scanner 200 has the plurality of first screw grooves G1 corresponding to the plurality of first screw holes H1, respectively. The plurality of first screws S1 are inserted into the plurality of first screw holes H1 and the plurality of first screw grooves G1, so that the optical scanner 200 and the second adapter 420 may be coupled to each other stably.

Each of an outer diameter of the plurality of first screws S1 may be in a range of from about 4 mm to about 6 mm, but embodiments are not limited thereto. In the figures, an embodiment is illustrated including four first screw holes H1, four first screw grooves G1, and four first screws S1, but embodiments are not limited thereto, and any suitable number of the first screw holes H1, the first screw grooves G1, and the first screws S1 may be included.

The plurality of first screws S1 are inserted in a first direction DR1 from the second adapter 420 toward the optical scanner 200. For example, as illustrated in FIG. 5, when the upper surface of the bottom portion 421 is referred to as a first surface S11 and a lower surface of the bottom portion 421 is referred to as a second surface S12, the optical scanner 200 may be disposed in direct contact with the first surface S11 of the bottom portion 421. In addition, one of the plurality of first screws S1 may be inserted, in the first direction DR1 from the second surface S12 toward the first surface S11, to both of a corresponding one of the first screw holes H1 and a corresponding one of the first screw grooves G1. In addition, each of the plurality of first screws S1 may be completely inserted into corresponding ones of the plurality of first screw holes H1 and corresponding ones of the plurality of first screw grooves G1, or only a portion, e.g., a head portion, of each of the plurality of first screws S1 may be inserted so that the respective first screw S1 may protrude from the second surface S12 of the bottom portion 421.

The optical scanner 200 according to an embodiment of the present invention overlaps along the first direction DR1 with the third through hole LH3 and the plurality of first screw holes H1 that are defined at the bottom portion 421, but does not overlap the plurality of second screw holes H2 that are defined at the bottom portion 421. Accordingly, an operator may easily couple the first adapter 410 and the second adapter 420 to each other, using the plurality of second crews S2 in a subsequent process.

Figure 6:
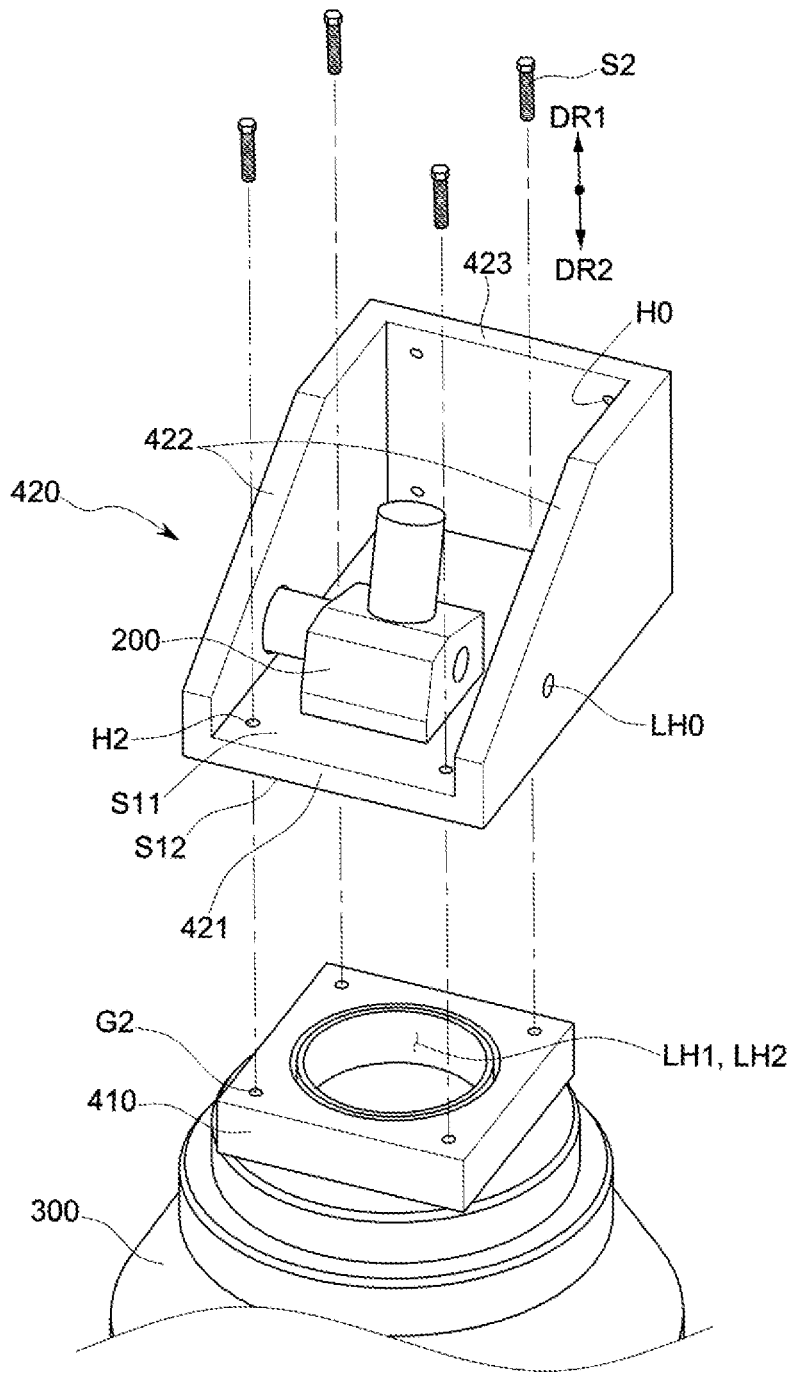

Next, referring to FIG. 6, the first adapter 410 and the second adapter 420 are coupled to each other by the plurality of second screws S2. For example, the first adapter 410 coupled to the lens unit 300 and the second adapter 420 coupled to the optical scanner 200 are coupled to each other by the plurality of second screws S2. For example, the bottom portion 421 of the second adapter 420 has a plurality of second fastener openings (e.g., second screw holes) H2, and the first adapter 410 has a plurality of second fastener grooves (e.g., second screw grooves) G2 corresponding to the plurality of second screw holes H2, respectively. The plurality of second screws S2 are inserted into the plurality of second screw holes H2 and the plurality of second screw grooves G2 so that the second adapter 420 and the first adapter 410 may be coupled to each other stably.

The plurality of second screws S2 secure the lens unit 300, which is relatively heavy in weight as compared to the optical scanner 200, and the first adapter 410 coupled to the lens unit 300. An outer diameter of the each of the plurality of second screws S2 may be substantially equal to or greater than an outer diameter of each of the plurality of first screws S1. For example, the outer diameter of each of the plurality of second screws S2 may be in a range of from about 6 mm to about 8 mm, but embodiments are not limited thereto. In the figures, an embodiment is illustrated including four second screw holes H2, four second screw grooves G2, and four second screws S2, but embodiments are not limited thereto, and any suitable number of the second screw holes H2, the second screw grooves G2, and the second screws S2 may be included.

The plurality of second screws S2 are inserted in a second direction DR2 from the second adapter 420 toward the first adapter 410. In such an embodiment, the first and second directions DR1 and DR2 are parallel to each other and are opposite to each other. For example, as illustrated in FIG. 6, when the upper surface of the bottom portion 421 is referred to as the first surface S11 and the lower surface of the bottom portion 421 is referred to as the second surface S12, the first adapter 410 may directly contact the second surface S12 of the bottom portion 421. In addition, one of the plurality of second screws S2 may be inserted, in the second direction DR2 from the first surface S11 toward the second surface S12, to both of a corresponding one of the second screw holes H2 and a corresponding one of the second screw grooves G2. In addition, each of the plurality of second screws S2 may be completely inserted into corresponding ones of the plurality of second screw holes H2 and corresponding ones of the plurality of second screw grooves G2, or only a portion of each of the plurality of second screws S2 may be inserted so that a head portion of each of the plurality of second screws S2 may protrude from the first surface S11 of the bottom portion 421.

The bottom portion 421 of the second adapter 420 according to an embodiment of the present invention may have an area larger than an area defined by the outer surface of the first adapter 410. Accordingly, rigidity of the second adapter 420 may be further improved, and the second adapter 420 may be stably coupled to each of the optical scanner 200 and the first adapter 410.

As such, as the laser processing apparatus 10 according to an embodiment of the present invention includes two adapters, e.g., the first and second adapters 410 and 420, disposed between the optical scanner 200 and the lens unit 300, a load of the lens unit 300 that is relatively heavy in weight may be substantially prevented from being concentrated to a local area. In addition, rigidity of the laser processing apparatus 10 may be further improved.

Hereinafter, another embodiment of the present invention is described with reference to FIG. 7. The description of configurations that are substantially the same as those described above may be omitted for convenience of explanation.

Figure 7:
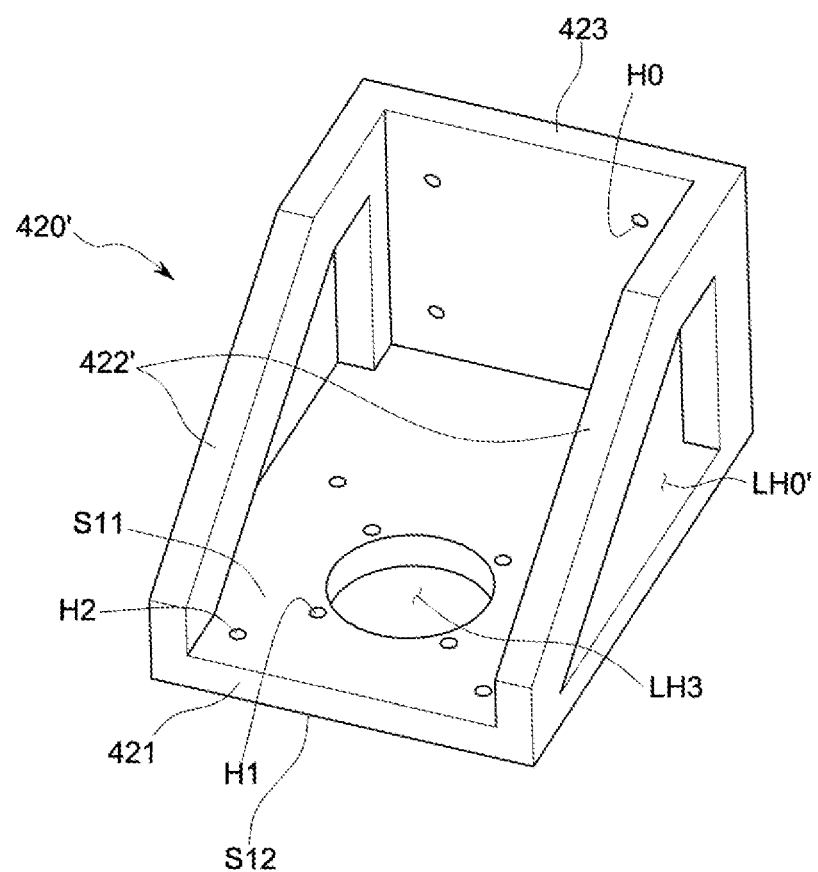
FIG. 7 is a perspective view illustrating a second adapter according to an embodiment of the present invention.

FIG. 7 is a perspective view illustrating a second adapter 420' according to another embodiment of the present invention.

Referring to FIG. 7, a second adapter 420' according to another embodiment of the present invention includes a bottom portion 421, opposite side portions 422' bent and extending from the bottom portion 421, and a support portion 423 bent and extending from the bottom portion 421 and the opposite side portions 422'. In such an embodiment, the opposite side portions 422' may have a shape of a ring that has a fifth opening LH0' on a cross-section thereof.

The opposite side portions 422' oppose each other with the optical scanner 200 disposed therebetween. The fifth opening LH0' defined at the opposite side portions 422' according to another embodiment of the present invention has a size that is relatively large as compared to a size of the fourth through hole LH0 discussed above. Accordingly, a path of a laser beam L that is incident to the optical scanner 200 may be more easily adjusted.

However, shapes of the second adapters 420 and 420' are not limited to the above-described embodiments, and the second adapters 420 and 420' may have any suitable shape known to those skilled in the art.

As set forth hereinabove, a laser processing apparatus according to one or more embodiments of the present invention may improve rigidity of the laser processing apparatus by including the first and second adapters.

While the present invention has been illustrated and described with reference to embodiments thereof, it will be apparent to those of ordinary skill in the art that various modifications and changes can be made to the described embodiments without departing from the spirit and scope of the present invention as defined by the following claims, and equivalents thereof.

What is claimed is:

1. A laser processing apparatus comprising:
a laser light source configured to emit a laser beam;
an optical scanner located along a path of the laser beam and configured to adjust the path of the laser beam;
a lens unit located along the path of the laser beam, the lens unit being configured to condense the laser beam;
a first adapter located between the lens unit and the optical scanner and coupled to the lens unit; and
a second adapter located between the first adapter and the optical scanner, the second adapter being coupled to the first adapter and the optical scanner, and defining a space to accommodate the optical scanner therein,
wherein the second adapter includes a bottom portion, the bottom portion having a larger area than an area defined by an outer surface of the first adapter, and
wherein the first adapter directly contacts the bottom portion of the second adapter without protruding into the bottom portion of the second adapter.

2. The laser processing apparatus of claim 1, wherein the lens unit comprises:
a lens; and
a lens housing comprising a coupling portion and a non-coupling portion, the lens housing accommodating the lens.

3. The laser processing apparatus of claim 2, wherein the coupling portion has a first opening located along the path of the laser beam, and has screw threads at an outer surface thereof.

4. The laser processing apparatus of claim 3, wherein the first adapter has screw threads at an inner surface thereof and is configured to be screw-coupled to the coupling portion.

5. The laser processing apparatus of claim 2, wherein an outer diameter of the coupling portion is less than an outer diameter of the non-coupling portion.

6. The laser processing apparatus of claim 1, wherein the lens unit comprises an F-theta lens unit that adjusts a focal length of the laser beam that is incident to the lens unit to a constant value.

7. A laser processing apparatus comprising:
a laser light source configured to emit a laser beam;
an optical scanner located along a path of the laser beam and configured to adjust the path of the laser beam;
a lens unit located along the path of the laser beam, the lens unit being configured to condense the laser beam;
a first adapter located between the lens unit and the optical scanner and coupled to the lens unit; and
a second adapter located between the first adapter and the optical scanner, the second adapter being coupled to the first adapter and the optical scanner,
wherein the second adapter comprises:
a bottom portion at which the optical scanner is seated, the bottom portion having a plurality of first fastener openings and a plurality of second fastener openings;
opposite side portions bent and extending from the bottom portion and opposing each other with the optical scanner interposed therebetween; and
a support portion bent and extending from the bottom portion and the opposite side portions.

8. The laser processing apparatus of claim 7, wherein the optical scanner directly contacts a first surface of the bottom portion, and
wherein the first adapter directly contacts a second surface of the bottom portion that opposes the first surface.

9. The laser processing apparatus of claim 7, wherein an area of the bottom portion is larger than an area defined by an outer surface of the first adapter on a plane.

10. The laser processing apparatus of claim 7,
wherein the optical scanner has a plurality of first grooves corresponding to the plurality of first fastener openings, respectively, and
wherein the first adapter has a plurality of second grooves corresponding to the plurality of second fastener openings, respectively.

11. The laser processing apparatus of claim 10, further comprising:

a plurality of first screws each inserted into corresponding ones of the plurality of first fastener openings and corresponding ones of the plurality of first grooves; and a plurality of second screws each inserted into corresponding ones of the plurality of second fastener openings and corresponding ones of the plurality of second grooves.

12. The laser processing apparatus of claim 11, wherein the plurality of first screws are inserted in a first direction from the second adapter toward the optical scanner, and wherein the plurality of second screws are inserted in a second direction from the second adapter toward the first adapter.

13. The laser processing apparatus of claim 12, wherein the first direction and the second direction are parallel to each other and opposite to each other.

14. The laser processing apparatus of claim 11, wherein an outer diameter of each of the plurality of first screws is substantially equal to or less than an outer diameter of each of the plurality of second screws.

15. The laser processing apparatus of claim 7, wherein the optical scanner does not overlap the plurality of second fastener openings.

16. The laser processing apparatus of claim 7, further comprising a frame coupled to the support portion.

17. The laser processing apparatus of claim 7, wherein at least one of the opposite side portions has a second opening located along the path of the laser beam.

\* \* \* \* \*